United States Patent [19]

Mori

[11] 4,272,123
[45] Jun. 9, 1981

[54] VEHICLE ROOF CONSTRUCTION

[75] Inventor: Keiji Mori, Toyota, Japan

[73] Assignee: Aisin Seiki Kabushiki Kaisha, Japan

[21] Appl. No.: 24,976

[22] Filed: Mar. 29, 1979

[30] Foreign Application Priority Data

Mar. 30, 1978 [JP] Japan .................. 53/37009

[51] Int. Cl.³ .............................................. B60J 7/04
[52] U.S. Cl. ..................................... 296/222; 296/223
[58] Field of Search ........... 296/137 D, 137 E, 137 F, 296/137 G, 137 H, 137 J, 222, 223, 216

[56] References Cited

U.S. PATENT DOCUMENTS

| 3,016,263 | 1/1962 | Rehmann | 296/137 E |
| 3,044,825 | 7/1962 | Golde | 296/137 E |
| 3,079,195 | 2/1963 | Golde et al. | 296/137 G |
| 3,290,087 | 12/1966 | Werner | 296/137 E |
| 3,873,150 | 3/1975 | Morr et al. | 296/137 H |
| 3,964,784 | 6/1976 | Prechter et al. | 296/137 G |
| 3,982,783 | 9/1976 | Vermeulen | 296/137 E |

FOREIGN PATENT DOCUMENTS

| 264667 | 9/1963 | Australia | 296/137 H |
| 986225 | 3/1965 | United Kingdom | 296/137 G |
| 1104320 | 2/1968 | United Kingdom | 296/137 E |

Primary Examiner—John J. Love
Assistant Examiner—Ross Weaver
Attorney, Agent, or Firm—Finnegan, Henderson, Farabow, Garrett & Dunner

[57] ABSTRACT

A vehicle roof including a fixed roof provided with an opening, a rail unit disposed around the opening, and a sliding roof slidably guided by the rail unit to close or open the opening. The rail unit comprises a pair of lateral guide rails disposed on opposite sides of the opening, a front rail disposed on the forward side thereof, and a pair of cornering members each interposed between the front rail and one of the lateral guide rails so as to interconnect each other. The rail unit and the sliding roof may be assembled before installation to the vehicle body, and be fitted to the vehicle body by insertion through an aperture thereof.

8 Claims, 7 Drawing Figures

FIG. I

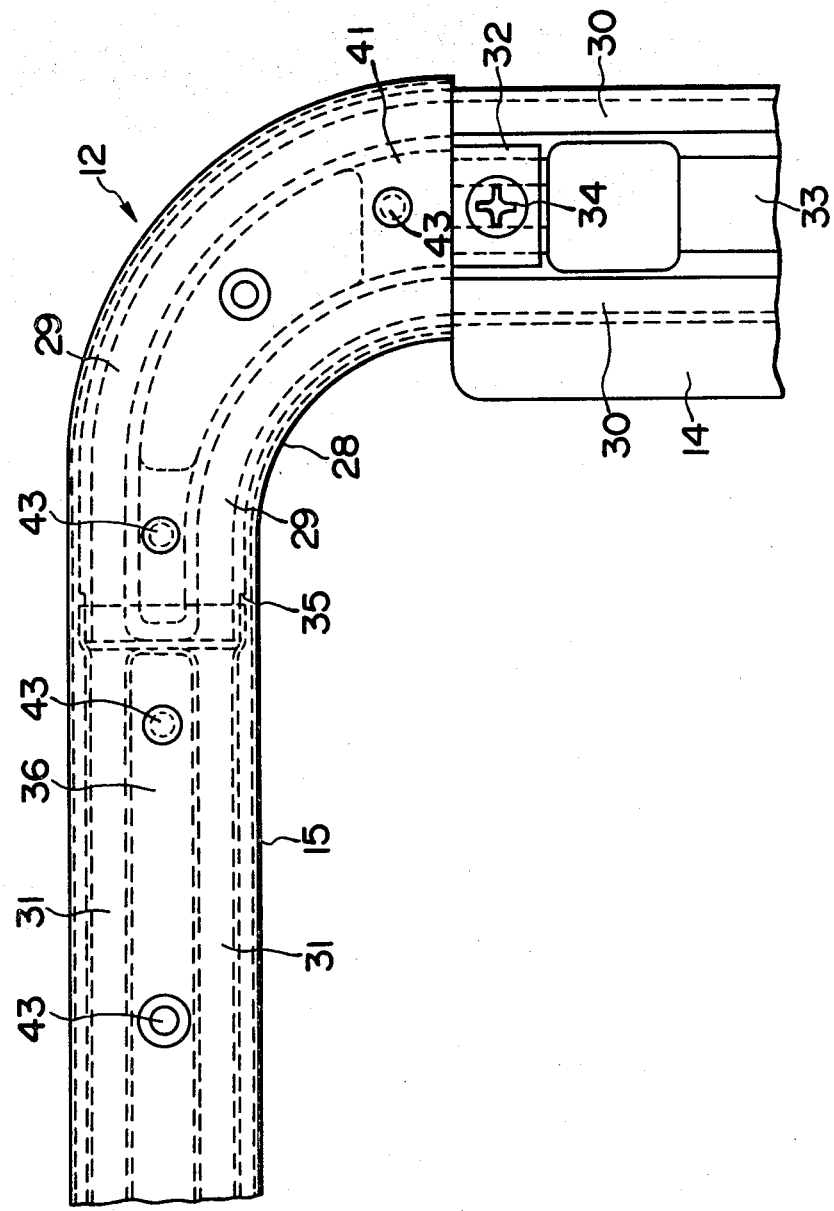

VEHICLE ROOF CONSTRUCTION

BACKGROUND OF THE INVENTION

This invention relates to a vehicle roof and more particularly to a rail construction for mounting and guiding the sliding roof of a vehicle.

There have been provided sliding roofs which may be moved in the longitudinal direction of vehicle along guide rails secured to the stationary part of the vehicle roof so as to close or open an opening provided on the stationary roof.

The guide rails generally include a front rail extending in the transverse direction of the vehicle, two parallel lateral rails extending in the longitudinal direction thereof and disposed on opposite sides of the opening. Each of these rails is provided with two parallel grooves in which two toothed cables are axially movable. Two shoe members connected to the sliding roof at lateral sides thereof are also movably mounted in the lateral rails to engage the toothed cables. The axial displacement of the toothed cables in opposite directions will cause the movement of the sliding roof through the shoe members.

One of the problems in assembling the sliding roof, together with the guide rails, to the stationary roof of vehicles is in the construction of the guide rails. That is, it is a conventional practice to fix the front rail and two lateral guide rails independently of each other to the inner panel of the vehicle roof. Therefore, skillful work in assembling is necessary and the vehicle body could be inadvertently injured due to the rails during such complicated assembling work. In addition, the mounting of the toothed cables onto the rails takes a lot of time since the worker has to make such mounting within the vehicle room and above his head.

SUMMARY OF THE INVENTION

Accordingly, it is one of the objects of the present invention to provide a vehicle roof which may obviate these conventional difficulties.

It is another object of the present invention to provide a vehicle roof which comprises a front rail and lateral guide rails as one rail unit, thereby mounting toothed cables and/or a sliding roof thereon as one assembly before installation to the vehicle.

It is a further object of the present invention to provide a vehicle roof in which a sliding roof assembly as well as one rail unit may be made outside of the assembly plant of vehicles.

It is still another object of the present invention to provide a vehicle roof in which the assembly work of a sliding roof takes less time and the vehicle body is less likely to be injured by sliding roof guide rails.

It is yet further object of the present invention to provide a vehicle roof in which a sliding roof as well as one rail unit may be installed to the vehicle body by insertion through an upper aperture thereof in the assembly plant of vehicles.

Other objects and features of the present invention will be understood in view of the following description with reference to the accompanying drawings.

BRIEF DESCRIPTION OF THE DRAWINGS

FIG. 3 is an enlarged view of a portion of the rail unit encircled by line III of FIG. 2;

DETAILED DESCRIPTION OF THE PREFERRED EMBODIMENTS

Figure 1:
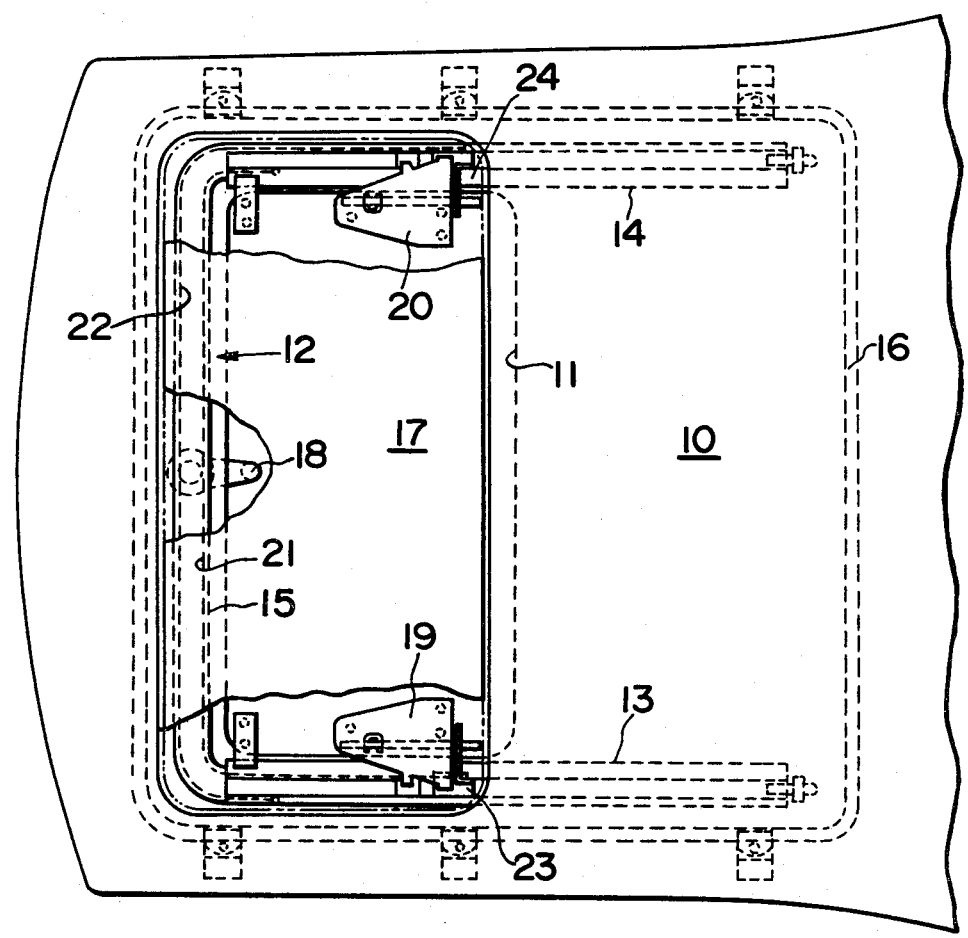
FIG. 1 is a fragmentary top plan view of a vehicle roof in accordance with the present invention.

With reference now to the drawings, the vehicle roof includes a stationary roof 10 provided with an opening 11 and a rail unit 12 fixed to and extending beneath the stationary roof 10. The rail unit 12 generally comprises two parallel guide rails 13, 14 disposed on opposite sides of the opening 11 and a front rail 15 disposed on the forward side of the opening 11, and is supported by a frame 16 fixed to the stationary roof 10. A sliding roof 17 is slidably carried by the rail unit 12 and movable between a closed position as shown in which the sliding roof 17 closes the opening 11 and an open position in which the sliding roof 17 is situated beneath the stationary roof 10. More specifically, the rotation of a manually operable handle 18 causes the sliding roof 17 at first to be lowered by suitable mechanism for the vertical movement, not shown, provided below brackets 19, 20. A further rotation of the handle 18 displaces toothed cables 21, 22 mounted in the rail unit 12 in axially opposite directions. Therefore, shoes 23, 24 connected to the sliding roof 17 and engaged with the toothed cables 21, 22 are moved in the right direction along the lateral guide rails 13, 14 to at least partly dispose the sliding roof 17 in a box 25 constituted by the stationary roof 10 and an inner roof panel 26 (see FIG. 6). An adverse rotation of the handle 18 will bring the sliding roof 17 to its closed position. The manual handle 18 may be displaced by an electric motor.

Figure 2:
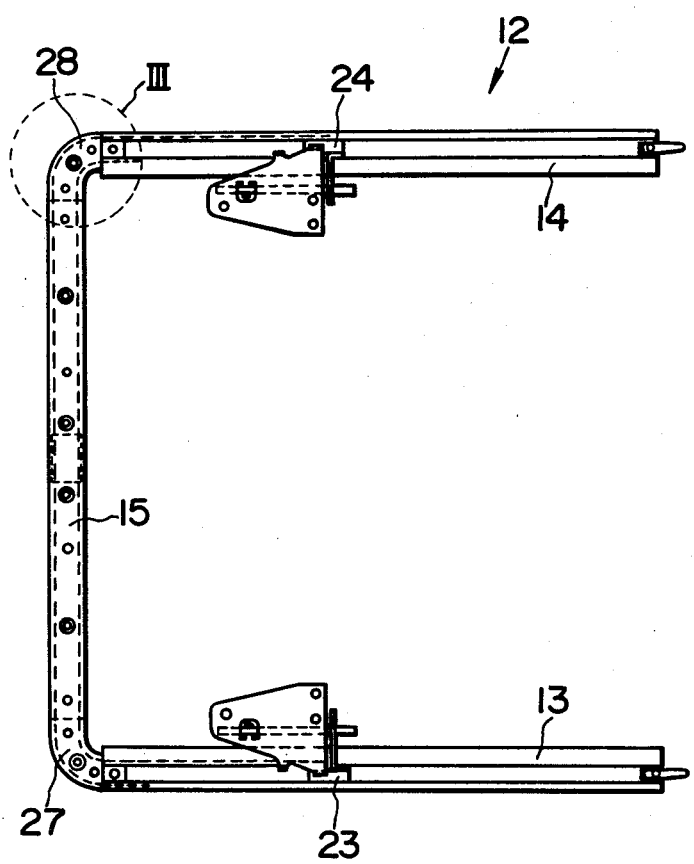
FIG. 2 is a plan view of a rail unit of FIG. 1.

In FIGS. 2 and 3, the rail unit 12 per se is clearly seen. The front rail 15 is fixedly fitted to the lateral guide rails 13, 14 at each end thereof through curved corner members 27, 28 formed by die-casting or pressing. Each of the members 27, 28 is provided with two parallel grooves 29 for guiding the cables 21, 22 and is of a radius of curvature suitable for depressing the increase in the slide resistance of the cables 21, 22 upon axial movement thereof in the guide grooves 29. The guide grooves 29 of the corner members 27, 28 are in alignment with two parallel guide grooves 30 of the lateral guide rails 13, 14 and two parallel guide grooves 31 of the front rail 15.

Figure 5:
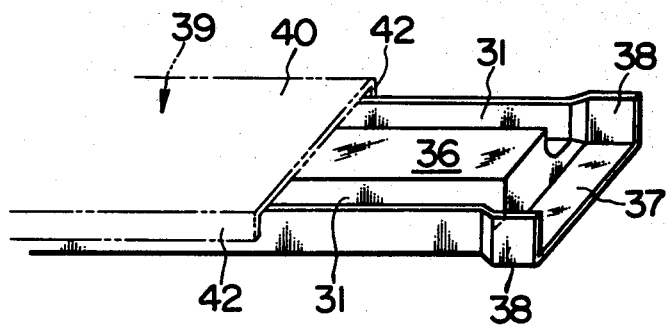
FIG. 5 is a view similar to FIG. 4 but showing one end of a front rail of the rail unit.
Figure 4:
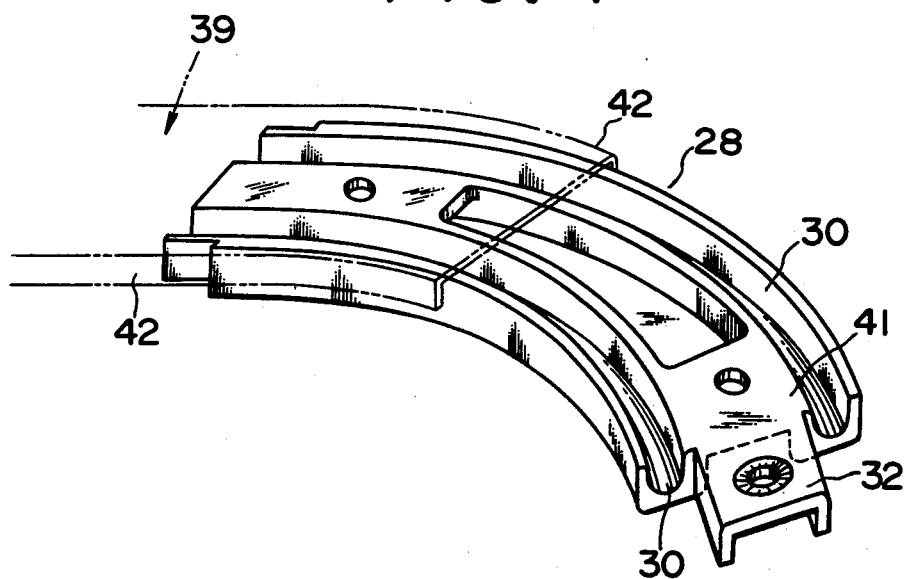
FIG. 4 is a perspective view of a corner member of the rail unit, a cover member being illustrated by chain-dotted line.

The corner member 28 is provided at one end thereof with a projection 32 between the parallel guide grooves 29 so as to engage an extrusion 33 of the lateral rail 14 and to be fixed to the lateral rail 14 by a fixing bolt 34, while at the other end thereby with a shoulder 35 to engage the front rail 15. That is, as best seen in FIG. 5, the front rail 15 is provided at one end thereof with an extrusion 36 between the parallel guide grooves 31, a bottom projection 37 in the same plan as the grooves 31, and a pair of lateral flanges 38 integral therewith. The bottom projection 37 may be fitted to the corner member 28. The front rail 15 has at the other end thereof the construction similar to the one end thereby to be fitted to the corner member 27.

A single cover 39 is fitted over the front rail 15 and the corner members 27, 28. The cover 39 includes an upper wall 40 abutting onto the extrusion 36 of the front rail 15 and an extrusion 41 of the corner members 27, 28, and a pair of downward flanges 42. The cover 39 is fixed at the upper wall 40 to the front rail 15 and the corner members 27, 28 by rivets 43, so that the rail and the corner members are secured to each other and the guide grooves 29, 31 are protected from foreign materials.

On the rail unit 12 thus constructed are mounted the toothed cables 21, 22, the shoes 24, and so on as an assembly before installation to the vehicle.

Figure 6:
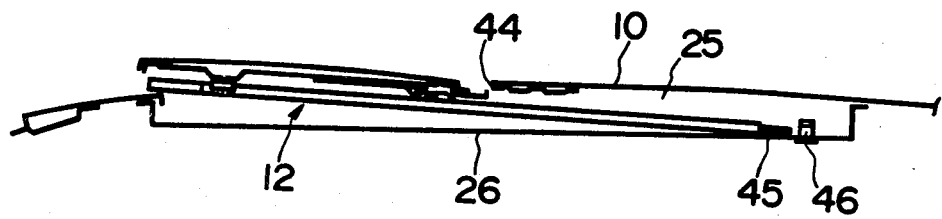
FIG. 6 is a schematic longitudinal vertical section through a vehicle roof.

FIG. 6 schematically illustrates the installation of the rail unit 12 to the vehicle roof. The rear end of the rail unit 12 is inserted through an upper aperture 44 of the stationary roof 10 into the box 25. Pins 45 at the rear end of the guide rails 13, 14 are carried by mountings 46 of the inner panel 26 to thereby fix the rail unit 12 in the relevant position.

Figure 7:
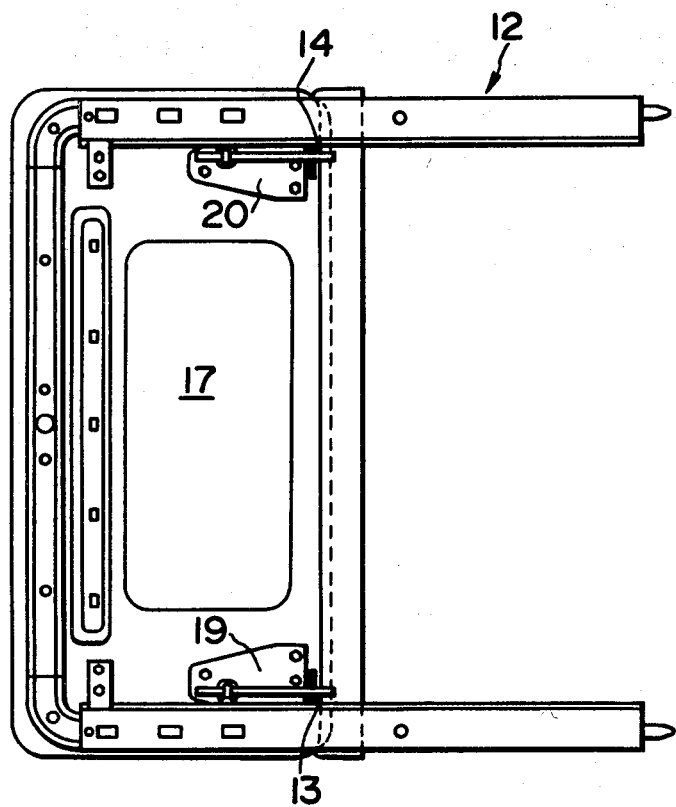
FIG. 7 is a view similar to FIG. 2 but showing another embodiment of the present invention.

In order to facilitate the assembly of the sliding roof to the vehicle, the sliding roof 17, which is connected to the shoes 13, 14 through the brackets 19, 20, is mounted on rail unit 12, as shown in FIG. 7.

Obviously, many modifications and variations of the present invention may be made in view of the above teachings.

What is claimed is:

1. A rail unit for a vehicle having a roof frame bounding an opening in the roof of the vehicle and a sliding roof movable to open and close said opening, said rail unit being completely assembled prior to being secured to the roof frame for slidably mounting the sliding roof thereon, said rail unit comprising:
   (a) a front rail extending transversely to the vehicle axis and having a pair of substantially parallel grooves therein;
   (b) a pair of lateral rails which extend substantially parallel to the vehicle axis at opposite sides of said opening, each of the lateral rails having a pair of substantially parallel grooves therein and having one end adjacent an end of the front rail;
   (c) a pair of cornering members, each interposed between an end of the front rail and an end of a lateral rail and having a pair of substantially parallel grooves therein, the ends of the grooves in each of the cornering members being in substantial alignment with the ends of the grooves in the adjacent front and lateral rails, and each cornering member including a projection extending from between the parallel grooves for engaging the adjacent lateral rail and securing it to the cornering member;
   (d) cable means operatively connected to the sliding roof for effecting movement thereof, the cable means being situated in, and guided by, the grooves in the front and lateral rails and the cornering members; and
   (e) a cover fixedly mounted on, and securing together, the front rail and the cornering members.

2. A rail unit as set forth in claim 1 wherein each of said cornering members comprises an extrusion provided between the parallel grooves in the cornering members, said extrusion including, at one end thereof, said projection to which is fixed an extrusion provided between the parallel grooves of said lateral rail.

3. A rail unit as set forth in claim 2 wherein each of said cornering members comprises at the other end thereof a shoulder, and said front rail comprises an extrusion provided between the parallel grooves in the front rail and a projection for engaging said shoulder.

4. A rail unit as set forth in claim 3 wherein said cover comprises a wall fixed to said extrusions of the front rail and cornering members through fastening means.

5. A rail unit as set forth in claim 1 wherein each of said cornering members has a radius of curvature adapted to depress the increase in the sliding resistance of said cable means.

6. A rail unit as set forth in claim 5 wherein said cover is formed from a single plate to engage said front rail and said curved cornering members.

7. A rail unit as set forth in claim 1 wherein said sliding roof as well as said cable means are mounted on said rail unit before installation to said vehicle.

8. A method of making a sliding roof construction for a vehicle having a roof frame bounding an opening in the roof of the vehicle and a sliding roof movable to open and close said opening, comprising:
   (a) constructing a rail unit having the sliding roof slidably mounted thereon, by:
      (i) providing a pair of substantially parallel, lateral rails extending substantially parallel to the vehicle axis, each of the lateral rails having a pair of substantially parallel grooves therein;
      (ii) providing a front rail extending transversely to the lateral rails and having each of its ends adjacent one end of the respective lateral rails, the front rail having a pair of substantially parallel grooves therein;
      (iii) providing a pair of cornering members, each interposed between an end of the front rail and an end of a lateral rail and having a pair of substantially parallel grooves therein, and securing each cornering member to the adjacent lateral rail;
      (iv) positioning the ends of the grooves in each of the cornering members in substantial alignment with the ends of the grooves in the adjacent front and lateral rails;
      (v) securing a cover on the front rail and the cornering members for protecting the grooves and for securing the front rail and cornering members together;
      (vi) positioning cable means in the grooves in the front and lateral rails and the cornering means, so as to be guided thereby, and operatively connecting the sliding roof to the cable means for effecting movement thereof; and
   (b) positioning the rail unit by inserting it through the opening in the roof frame; and
   (c) then, securing the rail unit to the roof frame.

* * * * *